(12) United States Patent  
Marew

(10) Patent No.: US 9,908,502 B2  
(45) Date of Patent: Mar. 6, 2018

(54) BELT PRO

(71) Applicant: Ayenew Marew, Lancaster, PA (US)

(72) Inventor: Ayenew Marew, Lancaster, PA (US)

( * ) Notice: Subject to any disclaimer, the term of this patent is extended or adjusted under 35 U.S.C. 154(b) by 0 days.

(21) Appl. No.: 14/880,556

(22) Filed: Oct. 12, 2015

(65) Prior Publication Data

US 2017/0096120 A1   Apr. 6, 2017

Related U.S. Application Data

(60) Provisional application No. 62/237,472, filed on Oct. 5, 2015.

(51) Int. Cl.
*B60R 22/00* (2006.01)
*A62B 35/00* (2006.01)
*B60R 22/12* (2006.01)

(52) U.S. Cl.
CPC ........ *B60R 22/12* (2013.01); *B60R 2022/006* (2013.01)

(58) Field of Classification Search
CPC .... B60R 22/00; B60R 22/12; B60R 2022/006
USPC .......................................................... 297/482
See application file for complete search history.

(56) References Cited

U.S. PATENT DOCUMENTS

| | | | | |
|---|---|---|---|---|
| 3,306,662 A | * | 2/1967 | Finnigan | B60R 22/00 297/482 |
| 4,057,181 A | * | 11/1977 | Finnigan | B60R 22/00 297/482 X |
| 4,619,468 A | * | 10/1986 | Spill | B60R 22/00 297/482 X |
| 4,693,495 A | * | 9/1987 | LaPointe | B60R 22/00 297/482 X |
| 4,699,401 A | * | 10/1987 | Saenz | B60R 22/00 297/482 X |
| 4,741,574 A | * | 5/1988 | Weightman | B60R 22/00 297/482 X |
| 4,795,190 A | * | 1/1989 | Weightman | B60R 22/00 297/482 X |
| 4,878,277 A | * | 11/1989 | Portuese | A44B 11/2576 297/482 X |

(Continued)

FOREIGN PATENT DOCUMENTS

DE   2641852 A1 *   3/1978   ............. B60R 22/00

OTHER PUBLICATIONS

English Abstract for DE 2641852 A1, Mar. 23, 1978—Attachment to Non-Final Office Action dated Jul. 28, 2016.*

*Primary Examiner* — Rodney B White
(74) *Attorney, Agent, or Firm* — RG Patent Consulting, LLC; Rachel Gilboy

(57) ABSTRACT

An antimicrobial barrier seatbelt covering apparatus for preventing a cross contamination between hosts contacting with a seatbelt includes stripes of antimicrobial material creating a barrier against pathogens accumulated on a seatbelt, a container for storage of the antimicrobial material that can be attached on one end of the seatbelt, and a holding device to fix the material on the other end of the seatbelt. The antimicrobial seatbelt covering may be used in applications including seatbelts in cars seats, airplanes, boats where the seatbelt covering controls the level of cross contamination by preventing unwanted microbes that contact the seatbelt and thereby, prevents the spread of disease and infections.

6 Claims, 2 Drawing Sheets

(56) References Cited

U.S. PATENT DOCUMENTS

| | | | | |
|---|---|---|---|---|
| 4,886,318 A * | 12/1989 | Pennock | B60R 22/00 | 297/482 X |
| 4,887,318 A * | 12/1989 | Weinreb | A45F 3/12 | 297/482 X |
| 4,921,273 A * | 5/1990 | Weightman | B60R 22/00 | 297/482 X |
| 4,939,824 A * | 7/1990 | Reed | A44B 11/2576 | 297/482 X |
| 4,944,530 A * | 7/1990 | Spurrier | A44B 11/2576 | 297/482 X |
| 5,261,728 A * | 11/1993 | Carmichael | B60R 21/12 | 297/482 X |
| 5,312,159 A * | 5/1994 | Essa | B60R 22/00 | 297/482 |
| 5,566,871 A * | 10/1996 | Weintraub | A45F 3/12 | 297/482 X |
| 5,584,536 A * | 12/1996 | White | B60R 22/00 | 297/482 |
| 5,732,975 A * | 3/1998 | Gallegos | B60R 22/12 | 297/482 X |
| 6,203,110 B1 * | 3/2001 | Proteau | B60R 22/024 | 297/482 |
| 6,409,271 B1 * | 6/2002 | Caramanis | B60R 22/00 | 297/482 X |
| 7,537,284 B1 * | 5/2009 | Antorcha | B60N 2/2881 | 297/482 X |
| 8,562,076 B2 * | 10/2013 | Currier | B60R 22/105 | 297/482 |
| 2002/0074847 A1 * | 6/2002 | Terpselas | B60R 22/024 | 297/482 X |
| 2004/0070256 A1 * | 4/2004 | Lee | B60R 22/00 | 297/482 |
| 2008/0179936 A1 * | 7/2008 | Mirmikidis | B64D 11/062 | 297/482 |
| 2011/0254344 A1 * | 10/2011 | Freeman | A62B 35/00 | 297/482 |
| 2013/0341979 A1 * | 12/2013 | Girard | A47C 7/021 | 297/227 |

\* cited by examiner

BELT PRO

(1) FIELD OF THE INVENTION

The field of invention relates to covering devices, and more particularly pertains to a new and improved vehicular seatbelt covering to provide an antimicrobial covering to an associated seatbelt and buckle pair to minimize associated microbial infection through the buckle pair when exposed to various unhygienic environments.

(2) BACKGROUND OF THE INVENTION

The use of seatbelts is becoming more and more prevalent in today's world. This is particularly true in regard to motor vehicles. The seatbelt cover is generally wrapped around the shoulder belt and secured with fasteners. Widespread attention has been focused in recent years on the consequences of bacterial contamination contracted by contact with common surfaces and objects.

A further difficulty is in connection with soiling of the user's clothing. Automobiles are normally used over an extended period of time and accordingly, the seatbelts in those vehicles are also used for many years. They tend to become worn and dirty as time goes on and there is relatively continuous use. In fact, even during non-use, the seatbelts will become dusty and accumulate dirt and other substances that can discolor and soil one's clothing.

U.S. Pat. No. 4,693,495 to Lapointe similarly sets forth a comfort adding covering for securement overlying a seatbelt flexible portion to enhance the comfort of a user utilizing hook and loop fasteners to secure the cushion to the seatbelt.

U.S. Pat. No. 4,699,401 to Saenz sets forth an additional flexible seatbelt covering to provide a protective cushioning to a seatbelt.

Many motorists and passengers complain about the wearing of seatbelts because seatbelts are not always very clean. So what is needed is an antimicrobial seatbelt cover that provides a barrier to the growth of microbes and decreases the amount of cross contamination between hosts coming into contact with the seatbelt.

As such, it may be appreciated that there is a continuing need for a new and improved vehicular seatbelt covering to overcome the problems of microbes transmission to the buckles and belts portions during exposure to extensive contamination and which may be further compactly and readily secured and in this respect, the present invention substantially fulfills this need.

(F) SUMMARY OF THE INVENTION

In view of the foregoing disadvantages and drawbacks inherent in the known types of seatbelt covering devices now present in the prior art, the present invention provides a vehicular seatbelt covering wherein the same may be readily and effectively secured to an associated seatbelt, prevention against microbes and fixedly secured thereto as desired. As such, the general purpose of the present invention, which will be described subsequently in greater detail, is to provide a new and improved vehicular seatbelt covering which has all the advantages of the prior art seatbelt coverings and none of the disadvantages.

To attain this, the present invention comprises a vehicular seatbelt covering formed of soft base material outwardly to the base covering with a central opening to expose the release mechanism of an associated seatbelt clasp. The seatbelt covering is formed with optional soft strips there within to secure the covering to the associated seatbelt buckles or alternatively, an optional hook and loop fastener patch is securable to the clasp and buckle portions of the seatbelt locking members to secure the covering to the associated clasp and buckle members.

It is therefore an object of the present invention to provide a new and improved vehicular seatbelt covering which has all the advantages of the prior art seatbelt coverings and none of the disadvantages.

It is another object of the present invention to provide a new and improved vehicular seatbelt covering which includes antimicrobial property which helps users and others to avoid risk of disease contractions when they are travelling.

It is a further object of the present invention to provide a new and improved vehicular seatbelt covering which is a durable and reliable construction and can be used in airplanes, cars, boats and other type of vehicles.

Other features and advantages of the present invention will become more apparent from the following detailed description, taken in conjunction with the accompanying drawings which illustrate, by way of example, the principles of the invention.

(G) BRIEF DESCRIPTION OF THE DRAWINGS

To further clarify various aspects of some example embodiments of the present invention, a more particular description of the invention will be rendered by reference to specific embodiments thereof which are illustrated in the appended drawing. It is appreciated that the drawing depicts only illustrated embodiments of the invention and are therefore not to be considered limiting of its scope. The invention will be described and explained with additional specificity and detail through the use of the accompanying drawing in which.

(H) DETAIL DESCRIPTION OF THE INVENTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

A seatbelt is a type of belt used to secure someone in the seat of a motor vehicle or aircraft. The seatbelts are anchored to the body of the vehicles and are subjected to spring tension which causes the seatbelt structure to bear against the users body. The seatbelt cover is a protective guard over the seatbelt. Widespread attention has been focused in recent years on the consequences of bacterial contamination contracted by contact with common surfaces and objects.

In particular, the invention is directed to antimicrobial seatbelt straps for covering and formed from a combination of antimicrobial and flexible, soft substrate materials. The flexible, soft substrate materials may be formed from a cotton material that is be made with or treated with an antimicrobial agent.

In an embodiment of the invention, the antimicrobial agent has antimicrobial properties to effectively kill or hinder the growth of microbes, which includes but is not limited to viruses, bacteria, mold, fungi, mildew, yeast, and spores, thereby decreasing the spread of pathogens or germs. The seatbelt covering device is disposable so that after one time using it could be disposed for the prevention of the contamination from micro-organisms. The seatbelt covering device is available in multi-color and could be made by single thread or double thread of cotton for better appearance and protection.

The present invention provides a new and improved vehicular seatbelt covering which may be easily and efficiently manufactured and marketed. Further the improved vehicular seatbelt covering which is of a durable and reliable construction.

Figure 1:
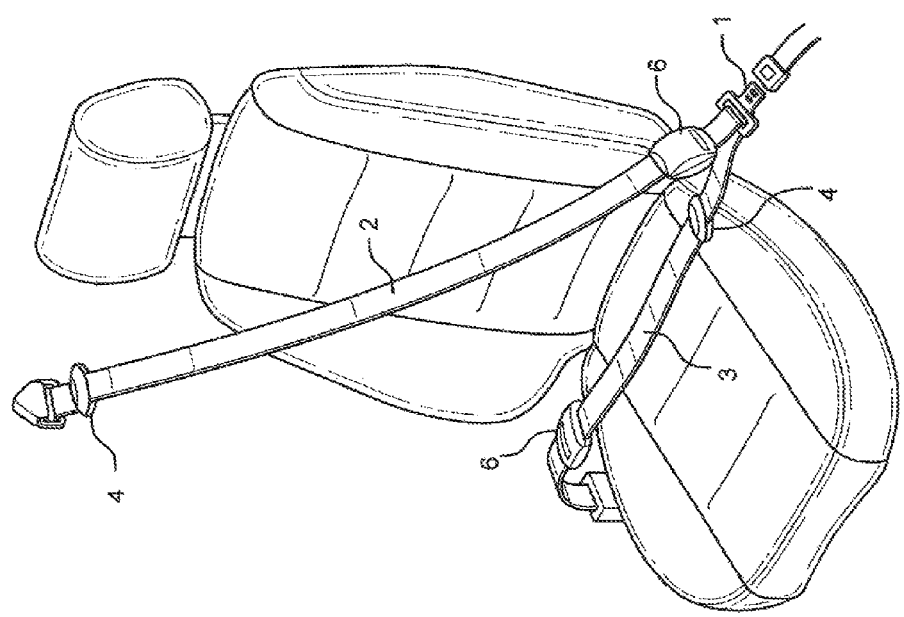
FIG. 1 depicts a three point seatbelt with two antimicrobial covering apparatus (car seatbelt).

FIG. 1 is a perspective view of a representative seatbelt covering arrangement. Seatbelt covering arrangement includes a securing be strap shows a three point seatbelt, a car seatbelt, with the antimicrobial covering apparatus. The seatbelt has three points to attach to a seat or to the wall. The three point seatbelt has a buckle 1 that divided the belt between a cross body belt 2 and a hip belt 3. To provide full protection with the invention, two antimicrobial covering apparatus shall be used. A clench device 4 is placed on the upper cross body part of the seatbelt next to the wall hanger 5 of seatbelt in FIGS. 1 and 2A; the roll holder 6 is dispensing the antimicrobial material and attached next to the buckle in FIG. 2B. The clench device 4 for the hip belt is placed next to the buckle in FIG. 2C, and the roll holder device 6 is secured by a grip next to the seatbelt connection 7 on the low side of the seat in FIG. 2D.

Figure 2:
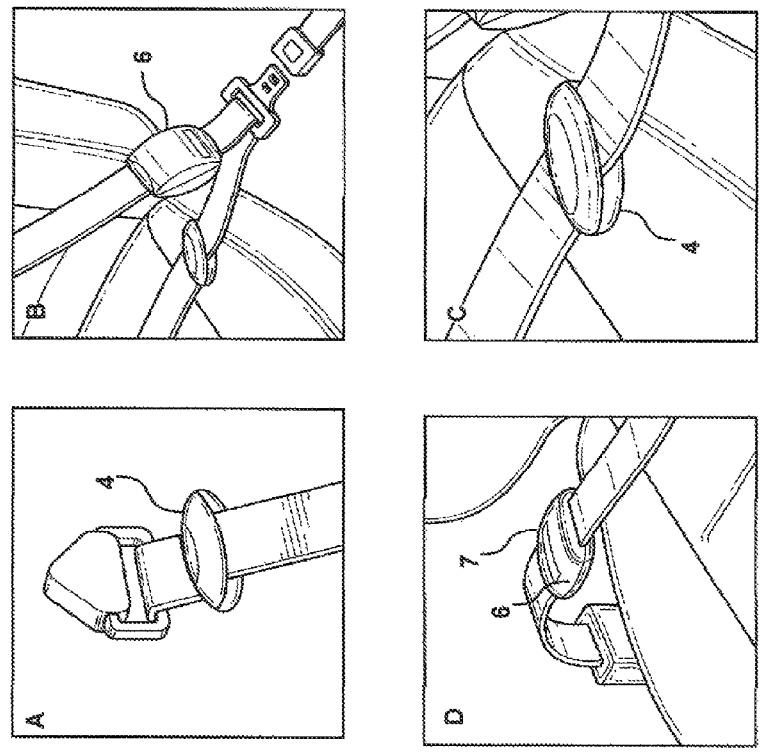
FIG. 2A depicts a clench device' upper position on a cross body seatbelt.
FIG. 2B depicts a roll holder device's position on the cross body seatbelt.
FIG. 2C depicts a low side clench device' position of the roll holder on a hip seatbelt.
FIG. 2D depicts a low side position of the roll holder on a hip seatbelt.
Figure 3:
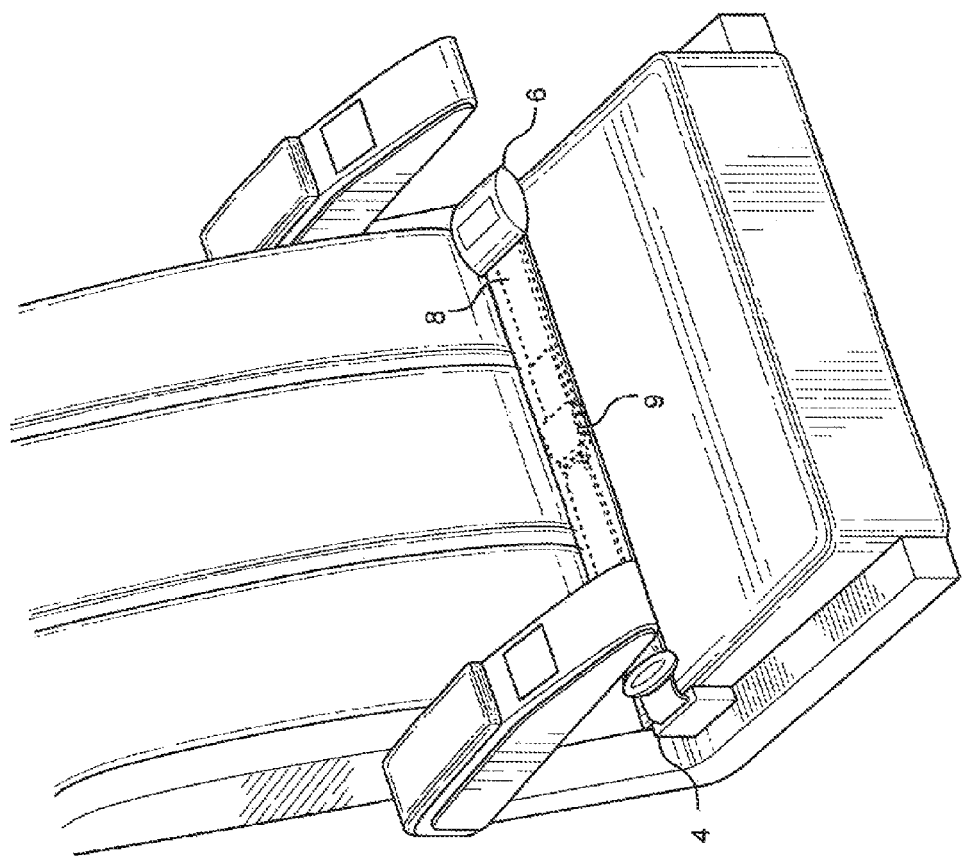
FIG. 3 depicts a two point seatbelt (airplane seatbelt) with the antimicrobial covering apparatus.

As it shown on FIG. 1-3 the roll holder devices allow to a host simply squeezes and pulls down the antimicrobial covering apparatus to all over the length of the vehicle's seatbelt. After one time using the seatbelt covering could be disposed to prevent spreading micro-organisms.

As shown in FIG. 3, the second invention embodiment, a two point seatbelt, airplane seatbelt, has only one hip belt 8 that requires only one antimicrobial covering apparatus. The airplane seatbelt has a belt connected by a buckle 9 lock in the middle. The roll holder device 6 is secured by the grip on one side of the hip belt next to the seatbelt connection with the seat, and two layers of the antimicrobial material are pulled out of the device passing through the airplane seat buckle and attached by the clench device 4 on the opposite side of the belt next to second connection point with the seat.

It is to be understood that the above description is intended to be illustrative, and not restrictive. For example, the above-discussed embodiments may be used in combination with each other. Many other embodiments will be apparent to those of skill in the art upon reviewing the above description.

Plural instances may be provided for components, operations or structures described herein as a single instance. Finally, boundaries between various components are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An antimicrobial barrier seatbelt covering apparatus for preventing a cross contamination between hosts contacting with a seatbelt comprising:
    an antimicrobial barrier covering material preventing pathogen spreading between hosts;
    a receptacle container for storage for said antimicrobial barrier covering material
    a protraction system for said antimicrobial barrier covering material;
    a pulling arrangement for dispensing of said antimicrobial barrier covering material; and
    a holding device for fixation of said antimicrobial barrier covering material on the seatbelt surfaces.

2. The antimicrobial barrier seatbelt covering apparatus of claim 1 wherein said material sterilizes, contains, and isolates pathogens.

3. The antimicrobial barrier seatbelt covering apparatus of claim 1 wherein said antimicrobial barrier covering material covers the seatbelt completely overlapping the seatbelt surfaces.

4. The antimicrobial barrier seatbelt covering apparatus of claim 1 wherein said seatbelt covering is disposable.

5. The antimicrobial barrier seatbelt covering apparatus of claim 1 wherein said seatbelt covering is available in multi-color.

6. The antimicrobial barrier seatbelt covering of claim 1 wherein one said seatbelt covering is attached to a cross body section of the seatbelt and another seatbelt covering is attached to a hip section of the seatbelt.

* * * * *